United States Patent
Lee et al.

(10) Patent No.: US 10,530,707 B2
(45) Date of Patent: Jan. 7, 2020

(54) MAPREDUCE APPARATUS, AND MAPREDUCE CONTROL APPARATUS AND METHOD

(71) Applicant: ELECTRONICS AND TELECOMMUNICATIONS RESEARCH INSTITUTE, Daejeon (KR)

(72) Inventors: Yeon Hee Lee, Daejeon (KR); Young Min Kim, Daejeon (KR); Hak Suh Kim, Daejeon (KR); Hea Sook Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 424 days.

(21) Appl. No.: 15/408,160

(22) Filed: Jan. 17, 2017

(65) Prior Publication Data

US 2017/0244650 A1    Aug. 24, 2017

(30) Foreign Application Priority Data

Feb. 18, 2016  (KR) .................. 10-2016-0019230

(51) Int. Cl.
| | | |
|---|---|---|
| *H04L 12/911* | (2013.01) | |
| *H04L 12/26* | (2006.01) | |
| *H04L 12/813* | (2013.01) | |

(52) U.S. Cl.
CPC ............ *H04L 47/822* (2013.01); *H04L 43/08* (2013.01); *H04L 47/20* (2013.01)

(58) Field of Classification Search
CPC ....... H04L 43/08; H04L 47/20; H04L 47/822; H04L 49/15
See application file for complete search history.

(56) References Cited

U.S. PATENT DOCUMENTS

| | | | |
|---|---|---|---|
| 2010/0122065 A1* | 5/2010 | Dean ..................... | G06F 9/4881 712/203 |
| 2011/0154339 A1 | 6/2011 | Lee et al. | |
| 2012/0151292 A1* | 6/2012 | Rowstron ............. | G06F 9/5066 714/748 |
| 2014/0059552 A1* | 2/2014 | Cunningham ........... | G09G 5/00 718/102 |
| 2014/0297826 A1 | 10/2014 | Park | |
| 2014/0358869 A1 | 12/2014 | Kim | |

(Continued)

FOREIGN PATENT DOCUMENTS

| | | |
|---|---|---|
| KR | 10-2009-0066010 A | 6/2009 |
| KR | 10-2014-0141053 A | 12/2014 |

*Primary Examiner* — Gil H. Lee
(74) *Attorney, Agent, or Firm* — Rabin & Berdo, P.C.

(57) ABSTRACT

Provided are a MapReduce apparatus and a MapReduce control apparatus and method. The MapReduce apparatus includes a map calculator configured to perform a map calculation, a combiner configured to aggregate and summarize map calculation results of the map calculator, a rack combiner configured to aggregate and summarize map calculation results of MapReduce apparatuses connected to the same rack switch according to a policy of a MapReduce control apparatus, and a reduce calculator configured to receive the aggregated and summarized results of the combiner or the rack combiner and perform a reduce calculation.

17 Claims, 5 Drawing Sheets

(56) References Cited

U.S. PATENT DOCUMENTS

2016/0098472 A1* 4/2016 Appleton .............. G06F 16/245
707/737
2017/0083588 A1* 3/2017 Lang ................. G06F 16/24526

* cited by examiner

MAPREDUCE APPARATUS, AND MAPREDUCE CONTROL APPARATUS AND METHOD

CROSS-REFERENCE TO RELATED APPLICATION

This application claims priority to and the benefit of Korean Patent Application No. 10-2016-0019230, filed on Feb. 18, 2016, the disclosure of which is incorporated herein by reference in its entirety.

BACKGROUND

1. Field of the Invention

The present invention relates to a distributed parallel computing technology for processing a large amount of data.

2. Discussion of Related Art

MapReduce, which has been developed by Google for the purpose of data processing for information retrieval, is a programming model for parallel data processing in a distributed environment and provides a method for processing a large amount of data. While hiding a distributed structure of a system by using the concepts of functions "map" and "reduce" of a programming language, MapReduce enables parallel programming by using a general-purpose programming language.

A MapReduce processing process involves a map calculation operation, a reduce calculation operation, and a shuffle and sort operation (referred to as a "shuffle operation" below) of moving data to reduce map calculation results. A map calculator reads a record and calculates a record having a new key and value by filtering the read record or converting the read record into another value. The calculated record is referred to as intermediate data and is stored in a local disk of the map calculator. A reduce calculator groups result values output through a map process based on the new key and then outputs a result of executing an aggregation operation. A shuffle operation involves a process of dividing a key bandwidth through partitioning, sorting and storing a map calculation result in the local disk, and then transferring the map calculation result as input data of reduce calculators via a network.

In the shuffle operation, all of the reduce calculators simultaneously copy map calculation results to their nodes through divided predetermined key bandwidths, and thus a load on the network is abruptly increased.

A combiner positioned between a map calculator and a reduce calculator is referred to as a "small reducer" and is selectively used to reduce a network load in the shuffle operation. When combiners are used, a combiner is executed for each of all map calculators that perform map calculations, receives data calculated by the corresponding map calculator, and performs a job corresponding to a designated function, thereby calculating summarized intermediate data. The calculated intermediate data is transmitted to a reduce calculator and used as input data of a reduce operation. However, even when combiners are used, it is not possible to avoid problems of a bandwidth difference between network layers and a network bottleneck between racks, that is, an inter-rack network bottleneck, resulting from an increase in the number of nodes in a cluster.

SUMMARY OF THE INVENTION

The present invention is directed to providing a MapReduce apparatus and a MapReduce control apparatus and method which are optimized for a network and employ a method for aggregation in units of racks.

According to an aspect of the present invention, there is provided a MapReduce apparatus including: a map calculator configured to perform a map calculation; a combiner configured to aggregate and summarize map calculation results of the map calculator; a rack combiner configured to aggregate and summarize map calculation results of MapReduce apparatuses connected to the same rack switch according to a policy of a MapReduce control apparatus; and a reduce calculator configured to receive the aggregated and summarized results of the combiner or the rack combiner and perform a reduce calculation.

The rack combiner may aggregate and summarize intra-rack map calculation results according to whether or not to combine racks, the number of MapReduce apparatuses which will combine racks, node-specific ranges (amounts) of intermediate data records for which racks will be combined, and a policy for the MapReduce apparatuses which will combine racks.

When the rack combiner finishes combining racks, the reduce calculator may receive bandwidth information of a new key according to new intermediate data from the MapReduce control apparatus and perform a reduce calculation.

According to another aspect of the present invention, there is provided a MapReduce control apparatus including: a rack combine policy device configured to reduce data moving between racks by controlling at least one MapReduce apparatus to aggregate and summarize intra-rack map calculation results in units of racks according to partition information for performing reduce calculations in a cluster environment configured with a stratified network and intra-rack or inter-rack network condition information. Here, the network condition information may include information on an inter-rack network band, an intra-rack network band, the amount of data to be shuffled among racks, and the amount of data to be shuffled within a rack.

The rack combine policy device may include: a partition information receiver configured to receive the partition information for performing reduce calculations; a rack combining policy unit configured to determine a rack combine policy for aggregating and summarizing the intra-rack map calculation results in units of racks using the partition information and the network condition information; and a shuffling policy unit configured to determine a shuffling policy for reduce calculators according to a determination result of the rack combining policy unit.

The rack combining policy unit may calculate an amount of data Din to be shuffled among MapReduce apparatuses in a rack and an amount of data Dout to be shuffled to a MapReduce apparatus of another rack, and calculate an estimated network delay time Sin for shuffling among nodes in a rack and an estimated network delay time Sout for shuffling among racks.

The estimated network delay time Sin for shuffling among nodes in a rack may be a value obtained by dividing the amount of data Din to be shuffled among MapReduce apparatuses in a rack by a sum Brack of network bandwidths of MapReduce apparatuses in a rack.

The estimated network delay time Sout for shuffling among racks may be a value obtained by dividing the amount of data Dout to be shuffled to a MapReduce apparatus of another rack by a network bandwidth Bcore between a rack switch and a core switch.

The rack combining policy unit may determine whether the estimated network delay time Sout for shuffling among racks is greater than the estimated network delay time Sin for shuffling among nodes in a rack, calculate an estimated delay time Sout' for shuffling among racks in a case of combining racks when it is determined that the estimated network delay time Sout for shuffling among racks is greater than the estimated network delay time Sin for shuffling among nodes in a rack (Sin<Sout), and determine whether a ratio (Sout/Sout') of the estimated network delay time Sout for shuffling before racks are combined to the estimated delay time Sout' for shuffling after racks are combined is greater than a preset threshold ratio r.

When the ratio (Sout/Sout') of the estimated network delay time Sout for shuffling before racks are combined to the estimated delay time Sout' for shuffling after racks are combined is greater than the preset threshold ratio r, the rack combining policy unit may determine whether or not to combine racks, the number of MapReduce apparatuses which will combine racks, and node-specific ranges (amounts) of intermediate data records for which racks will be combined, determine MapReduce apparatuses which will combine racks, and instruct the MapReduce apparatuses to combine racks.

When the rack combining policy unit is notified that all rack combiners of MapReduce apparatuses have finished combining racks, the rack combining policy unit may transfer bandwidth information of a new key according to new intermediate data to reduce calculators of the MapReduce apparatuses through the shuffling policy unit and instruct the reduce calculators to perform reduce calculations.

According to another aspect of the present invention, there is provided a MapReduce control method including: receiving partition information for performing reduce calculations; determining a rack combine policy for aggregating and summarizing intra-rack map calculation results in units of racks based on the partition information and network condition information; and instructing corresponding MapReduce apparatuses to combine racks according to the determined rack combine policy.

The determining of the rack combine policy may include: calculating an amount of data Din to be shuffled among MapReduce apparatuses in a rack and an amount of data Dout to be shuffled to a MapReduce apparatus of another rack; calculating an estimated network delay time Sin for shuffling among nodes in a rack; and calculating an estimated network delay time Sout for shuffling among racks.

The calculating of the estimated network delay time Sin for shuffling among nodes in a rack may include dividing the amount of data Din to be shuffled among MapReduce apparatuses in a rack by a sum Brack of network bandwidths of MapReduce apparatuses in a rack.

The calculating of the estimated network delay time Sout for shuffling among racks may include dividing the amount of data Dout to be shuffled to a MapReduce apparatus of another rack by a network bandwidth Bcore between a rack switch and a core switch.

The determining of the rack combine policy may include: determining whether an estimated network delay time Sout for shuffling among racks is greater than an estimated network delay time Sin for shuffling among nodes in a rack; calculating an estimated delay time Sout' for shuffling among racks in a case of combining racks when the estimated network delay time Sout for shuffling among racks is greater than the estimated network delay time Sin for shuffling among nodes in a rack (Sin<Sout); and determining whether a ratio (Sout/Sout') of the estimated network delay time Sout for shuffling before racks are combined to the estimated delay time Sout' for shuffling after racks are combined is greater than a preset threshold ratio r. Here, when the ratio (Sout/Sout') of the estimated network delay time Sout for shuffling before racks are combined to the estimated delay time Sout' for shuffling after racks are combined is greater than the preset threshold ratio r, the determining of the rack combine policy may further include: determining whether or not to combine racks, the number of MapReduce apparatuses which will combine racks, and node-specific ranges (amounts) of intermediate data records for which racks will be combined; and determining MapReduce apparatuses which will combine racks.

The MapReduce control method may further include, when the rack MapReduce control apparatus is notified that all rack combiners of MapReduce apparatuses have finished combining racks, transferring bandwidth information of a new key according to new intermediate data to reduce calculators of the MapReduce apparatuses and instructing the reduce calculators to perform reduce calculations.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present invention will be described in detail with reference to the accompanying drawings. In the following description of the present invention, a detailed description of known art related to the present invention will be omitted when it is determined to unnecessarily obscure the subject matter of the present invention. Also, the terms used in the following description are terms that have been defined in consideration of functions in the exemplary embodiments of the present invention and may vary depending on a user's or an operator's intention, practices, or so on. Therefore, definitions of terms used herein should be made based on the content throughout the specification.

Throughout the specification, when a part is referred to as "including" a component, the part does not exclude another component and may include another component unless defined otherwise.

Figure 1A:
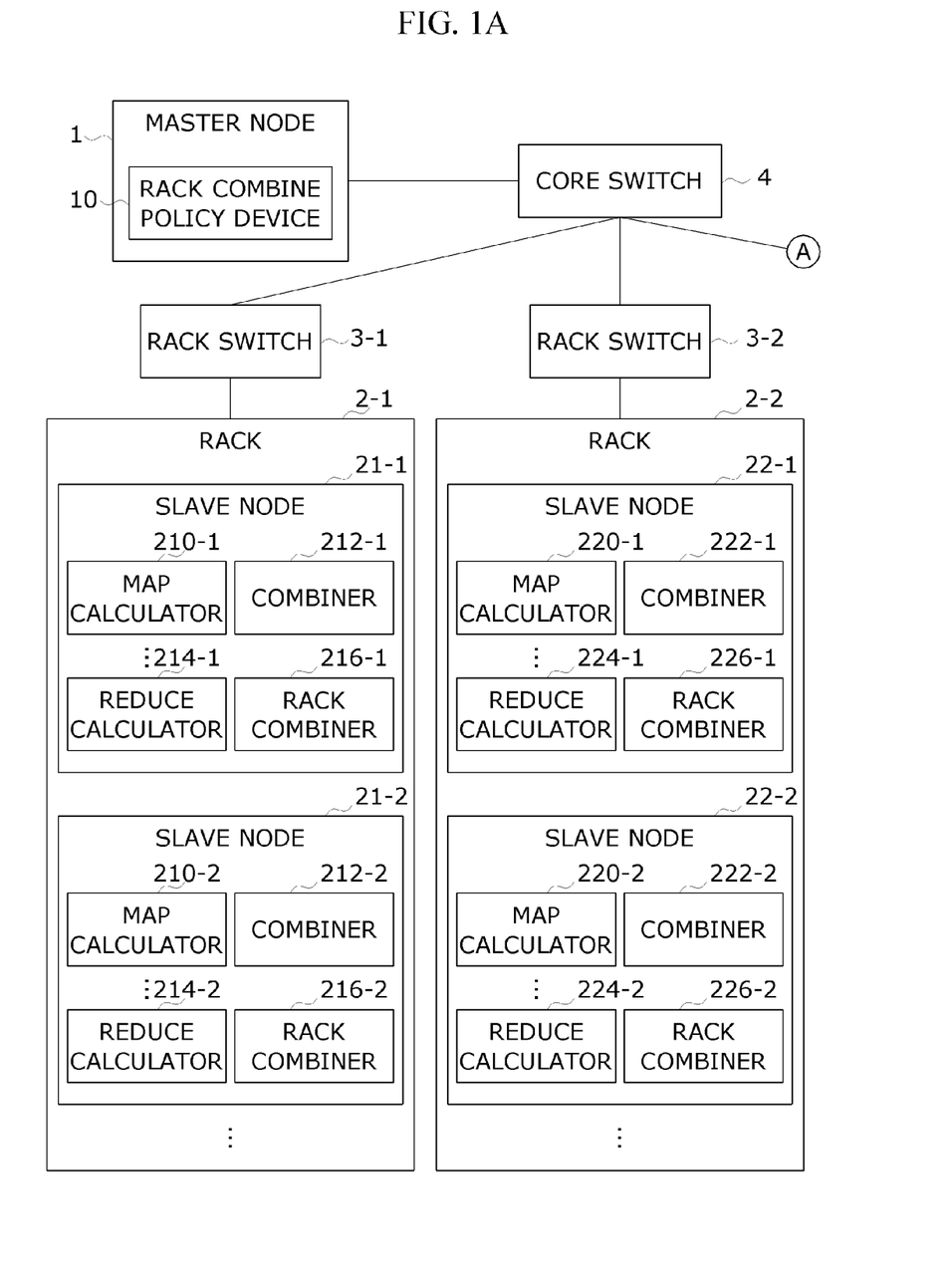
FIG. 1A and FIG. 1B is a block diagram of a MapReduce system in a cluster environment in which MapReduce is performed according to an exemplary embodiment of the present invention.
Figure 1B:
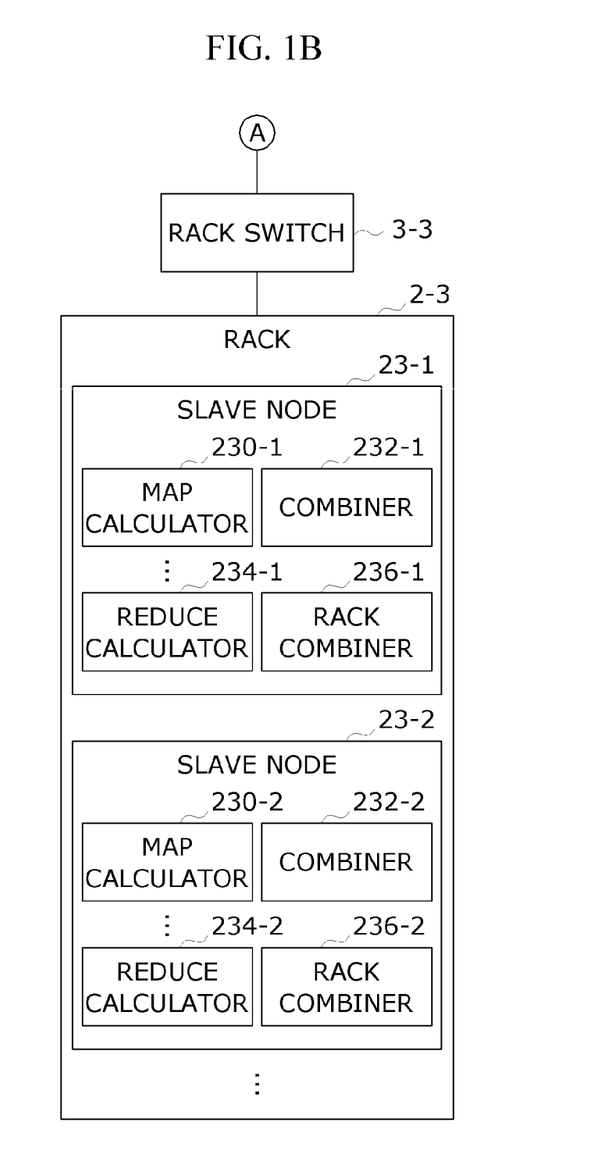

FIG. 1A and FIG. 1B is a block diagram of a MapReduce system in a cluster environment in which MapReduce is performed according to an exemplary embodiment of the present invention.

Referring to FIG. 1A and FIG. 1B, in a MapReduce system, one master node 1 and one or more slave nodes 21-1, 21-2, 22-1, 22-2, 23-1, and 23-2 are connected via a network. The number and arrangement of nodes shown in FIG. 1 are merely an example for aiding in understanding the present invention, and the number and arrangement of nodes are not limited thereto. The slave nodes 21-1, 21-2, 22-1, 22-2, 23-1, and 23-2 are MapReduce apparatuses that perform at least one of a map calculation and a reduce calculation, and the master node 1 is a MapReduce control apparatus that controls the MapReduce apparatuses.

The slave nodes 21-1, 21-2, 22-1, 22-2, 23-1, and 23-2 may be positioned in racks 2-1, 2-2, and 2-3 in a distributed manner. For example, the slave nodes 21-1 and 21-2 may be positioned in the rack 2-1. Nodes of each rack are connected to one or more rack switches 3-1, 3-2, and 3-3. For example, the slave nodes 21-1 and 21-2 are connected to the rack switch 3-1. Each of the rack switches 3-1, 3-2, and 3-3 may be connected to a core switch 4, or the rack switches 3-1, 3-2, and 3-3 may be directly connected to each other. Such a hierarchical connection of switches may be one or more in number.

The master node 1 includes a rack combine policy device 10 that establishes a rack combine policy. The rack combine policy device 10 may be operated in a separate system. The rack combine policy device 10 may be implemented by a processor of the master node 1, and data for performing an operation of the processor or data generated during an operation thereof may be stored in a memory.

The slave nodes 21-1, 21-2, 22-1, 22-2, 23-1, and 23-2 include map calculators 210-1, 210-2, 220-1, 220-2, 230-1, and 230-2 that perform map calculations, reduce calculators 214-1, 214-2, 224-1, 224-2, 234-1, and 234-2 that perform reduce calculations, combiners 212-1, 212-2, 222-1, 222-2, 232-1, and 232-2 that are operated when combining of map calculation results is requested, and rack combiners 216-1, 216-2, 226-1, 226-2, 236-1 and 236-2. For example, the slave node 21-1 of the rack 2-1 includes the map calculator 210-1, the reduce calculator 214-1, the combiner 212-1, and the rack combiner 216-1. The map calculators 210-1, 210-2, 220-1, 220-2, 230-1, and 230-2, the reduce calculators 214-1, 214-2, 224-1, 224-2, 234-1, and 234-2, the combiners 212-1, 212-2, 222-1, 222-2, 232-1, and 232-2, and rack combiners 216-1, 216-2, 226-1, 226-2, 236-1 and 236-2 may be implemented by processors of the slave nodes 21-1, 21-2, 22-1, 22-2, 23-1, and 23-2, and data for performing operations of the processors or data generated during operations thereof may be stored in memories.

In a cluster environment configured with a stratified network, the MapReduce system according to an exemplary embodiment of the present invention aggregates and summarizes intra-rack map calculation results through the rack combiners 216-1, 216-2, 226-1, 226-2, 236-1, and 236-2, and then performs a reduce process through the reduce calculators 214-1, 214-2, 224-1, 224-2, 234-1, and 234-2. Accordingly, by reducing data moving between the racks during a shuffle process, it is possible to relieve a bottleneck of a network link and improve MapReduce computation and processing performance. Also, when the amount of intermediate data is reduced, it is possible to improve overall MapReduce computation processing performance by reducing disk input/output (I/O) overheads of the map calculators and the amount of disk I/O of the reduce calculators during the shuffle process. Further, a configuration of a MapReduce computation is implemented in the form of a plug-in without any change, and thus an existing MapReduce framework can be used as is.

Figure 2:
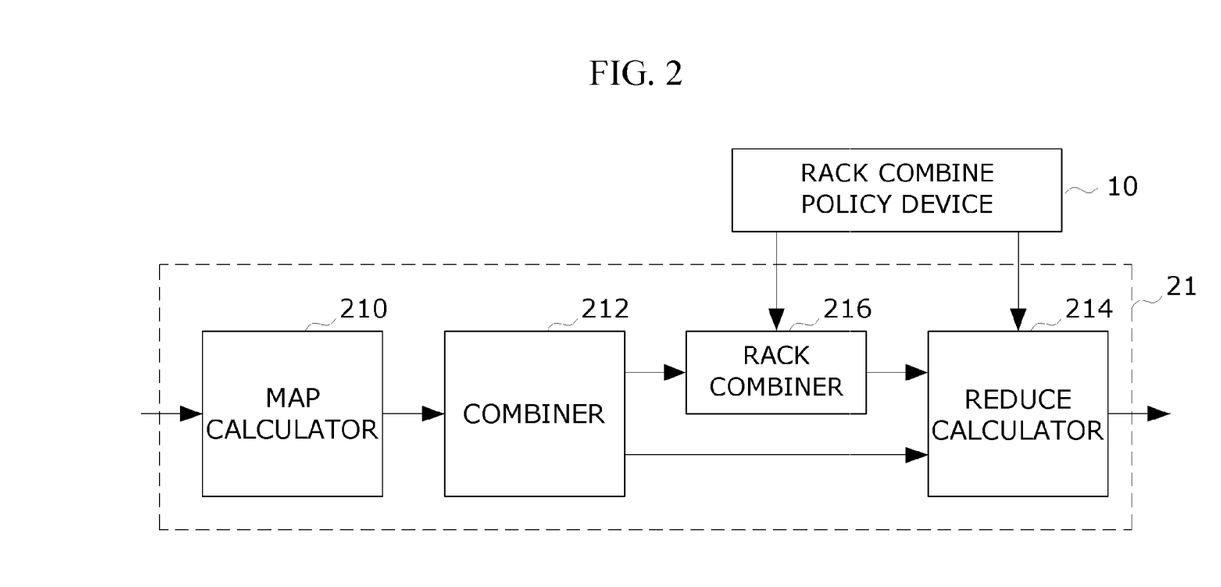
FIG. 2 is a block diagram of a slave node illustrating a processing flow of the slave node including a rack combiner according to an exemplary embodiment of the present invention.

FIG. 2 is a block diagram of a slave node illustrating a processing flow of the slave node including a rack combiner according to an exemplary embodiment of the present invention.

Referring to FIG. 2, a map calculator 210 of a slave node 21 performs a map calculation, and a combiner 212 aggregates and summarizes the map calculation results. Subsequently, when the rack combine policy device 10 of the master node 1 determines whether or not to combine racks and nodes that will combine racks, a rack combiner 216 aggregates and summarizes map calculation results of slave nodes connected to the same rack switch according to an instruction of the rack combine policy device 10. After the shuffle process, a reduce calculator 214 performs a reduce calculation.

Figure 3:
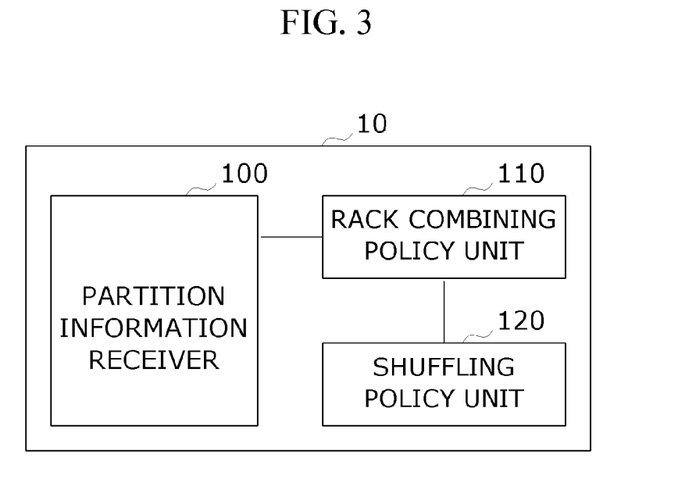
FIG. 3 is a detailed block diagram of a rack combine policy device according to an exemplary embodiment of the present invention.

FIG. 3 is a detailed block diagram of a rack combine policy device of a master node according to an exemplary embodiment of the present invention.

Referring to FIGS. 2 and 3, the rack combine policy device 10 of the master node 1 includes a partition information receiver 100, a rack combining policy unit 110, and a shuffling policy unit 120.

The rack combine policy device 10 controls at least one slave node so that the slave node aggregates and summarizes intra-rack map calculation results in units of racks according to partition information for performing reduce calculations and inter-rack or intra-rack network condition information in a cluster environment configured with a stratified network, thereby reducing data moving between racks. At this time, the network condition information includes an inter-rack network band, an intra-rack network band, the amount of data to be shuffled among racks, and the amount of data to be shuffled within a rack. A detailed configuration of the rack combine policy device 10 will be described below with reference to FIG. 3.

The partition information receiver 100 of the rack combine policy device 10 receives partition information about map calculation results to be processed by the reduce calculator 214, that is, information about which reduce calculator 214 will process which key value existing where, from a job tracker. The job tracker serves to distribute map calculations or reduce calculations to slave nodes according to a map reduce job request of a user.

The rack combining policy unit 110 determines whether or not to combine racks, a range (the amount) of intermediate data records for which racks will be combined, and slave nodes which will combine racks using partition information, information on a physical position of each slave node, and network bandwidth information received through the partition information receiver 100.

The shuffling policy unit 120 determines a shuffling policy for the reduce calculator 214 according to a determination result of the rack combining policy unit 110. For example, the shuffling policy unit 120 instructs the reduce calculator 214 to perform delayed shuffling according to a determination result of the rack combining policy unit 110. The rack combining policy unit 110 transfers bandwidth information of a key for combining racks to rack combiners 216 of slave nodes which will combine racks and instructs the rack combiners 216 to combine racks. When the rack combining policy unit 110 is notified that the rack combiners 216 have finished combining racks, the shuffling policy unit 120 transfers bandwidth information of a new key according to new intermediate data to reduce calculators 214 and instructs the reduce calculators 214 to perform reduce calculations.

Figure 4:
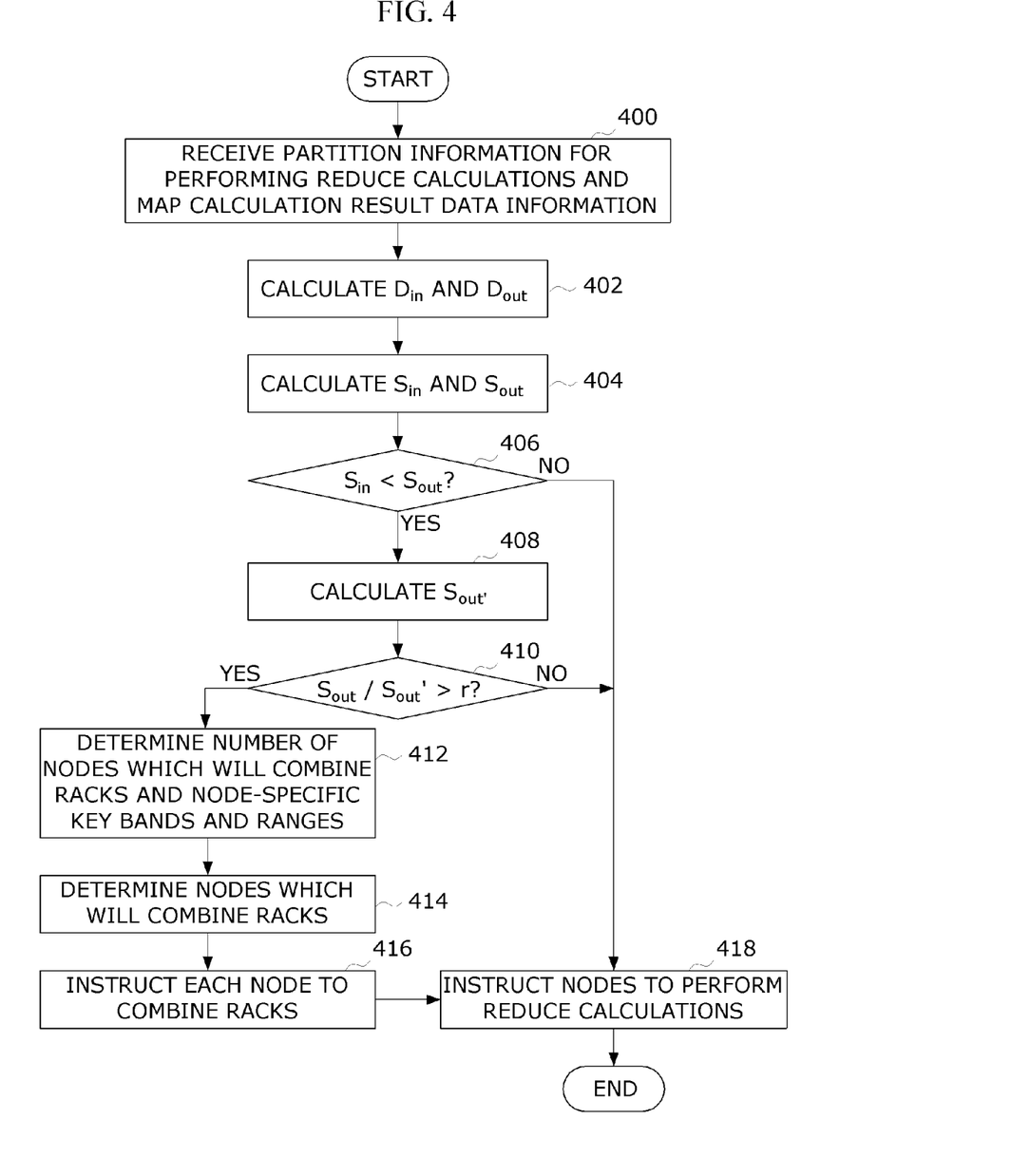
FIG. 4 is a flowchart illustrating an operation process of a rack combine policy device according to an exemplary embodiment of the present invention.

FIG. 4 is a flowchart illustrating an operation process of a rack combine policy device according to an exemplary embodiment of the present invention.

Referring to FIG. 4, a rack combine policy device of a master node receives partition information for performing reduce calculations and map calculation result data information (400). Then, using the received information, the rack combine policy device calculates an amount of data to be shuffled among slave nodes in a rack (referred to as "Din" below) and an amount of data Dout to be shuffled to a slave node in another rack (402). Subsequently, an estimated network delay time Sin for shuffling among nodes in a rack is calculated and an estimated network delay time Sout for shuffling among racks is calculated (404). The estimated network delay time Sin for shuffling among nodes in a rack may be a value obtained by dividing the amount of data Din to be shuffled among slave nodes in a rack by a sum Brack of network bandwidths of slave nodes in a rack. The estimated network delay time Sout for shuffling among racks may be a value obtained by dividing the amount of data Dout to be shuffled to a slave node in another rack by a network bandwidth Bcore between a rack switch and a core switch.

Subsequently, whether the estimated network delay time Sout for shuffling among racks is greater than the estimated network delay time Sin for shuffling among nodes in a rack is determined (406). When it is determined that Sin<Sout, an estimated delay time Sout' for shuffling among racks in the case of combining racks is calculated (408), and whether a ratio (Sout/Sout') of the estimated network delay time Sout for shuffling before racks are combined to the estimated delay time Sout' for shuffling after racks are combined is greater than a preset threshold ratio r is determined (410). When it is determined that Sout/Sout' is greater than or equal to the preset threshold ratio r, whether or not to combine racks, the number of slave nodes which will combine racks, and node-specific ranges (amounts) of intermediate data records for which racks will be combined are determined (412). Subsequently, slave nodes which will combine racks are determined (414), and then the corresponding nodes are instructed to combine racks (418).

According to exemplary embodiments of the present invention, by reducing data moving between racks during a shuffle process in a stratified network, it is possible to relieve a network link bottleneck and improve MapReduce computation and processing performance.

Also, according to exemplary embodiments of the present invention, when the amount of intermediate data is reduced, it is possible to improve overall computation and processing performance for MapReduce by reducing disk I/O overheads of map calculators and the amount of disk I/O of reduce calculators.

Further, according to exemplary embodiments of the present invention, a configuration of a MapReduce computation is implemented in a plug-in form without any change, and thus an existing MapReduce framework can be used as is.

The above description of the present invention is exemplary, and those of ordinary skill in the art will appreciate that the present invention can be easily carried out in other detailed forms without changing the technical spirit or essential characteristics of the present invention. Therefore, it should be noted that the exemplary embodiments described above are exemplary in all aspects and are not restrictive. For example, each component described to be a single type can be implemented in a distributed manner. Likewise, components described to be distributed can be implemented in a combined manner.

It should also be noted that the scope of the present invention is defined by the claims rather than the description of the present invention, and the meanings and ranges of the claims and all modifications derived from the concept of equivalents fall within the scope of the present invention.

What is claimed is:

1. A MapReduce system, comprising:
a plurality of racks, each rack including at least one node, each node including a MapReduce apparatus; and
a MapReduce control apparatus configured to control a MapReduce operation of the MapReduce apparatuses of the plurality of racks,
wherein each MapReduce apparatus comprises:
a map calculator configured to perform a map calculation;
a combiner configured to aggregate and summarize map calculation results of the map calculator;
a rack combiner configured to aggregate and summarize map calculation results of MapReduce apparatuses connected to a same rack switch according to a policy of the MapReduce control apparatus; and
a reduce calculator configured to receive the aggregated and summarized results of the combiner or the rack combiner and perform a reduce calculation,
wherein the MapReduce control apparatus includes a rack combining policy unit that determines whether an estimated network delay time Sout for shuffling among the racks is greater than an estimated network delay time Sin for shuffling among nodes in a rack, from among the plurality of racks, calculates an estimated delay time Sout' for shuffling among the racks in a case of combining the racks when it is determined that the estimated network delay time Sout for shuffling among the racks is greater than the estimated network delay time Sout for shuffling among nodes in the rack (Sin<Sout), and determines whether a ratio (Sout/Sout') of the estimated network delay time Sout for shuffling before the racks are combined to the estimated delay time Sout' for shuffling after the racks are combined is greater than a preset threshold ratio r, and
wherein the rack combining policy unit controls data shuffling among a plurality of nodes in at least one of the plurality of racks and between different racks of the plurality of racks based on the determination whether the ratio (Sout/Sout') of the estimated network delay time Sout for shuffling before the racks are combined to the estimated delay time Sout' for shuffling after the racks are combined is greater than the preset threshold ratio r.

2. The MapReduce system of claim 1, wherein the rack combiner aggregates and summarizes intra-rack map calculation results according to whether or not to combine the racks, a number of MapReduce apparatuses which will combine the racks, node-specific ranges (amounts) of intermediate data records for which the racks will be combined, and a policy for the MapReduce apparatuses which will combine the racks.

3. The MapReduce system of claim 1, wherein, when the rack combiner finishes combining the racks, the reduce calculator receives bandwidth information of a new key according to new intermediate data from the MapReduce control apparatus and performs the reduce calculation.

4. A MapReduce control apparatus comprising:
a rack combine policy device configured to reduce data moving between a plurality of racks, each rack including at least one node, each node including a MapReduce apparatus, by controlling at least one MapReduce apparatus to aggregate and summarize intra-rack map calculation results in units of racks according to partition information for performing reduce calculations in a cluster environment configured with a stratified network and intra-rack or inter-rack network condition information, wherein the rack combine policy device includes:
a rack combining policy unit configured to determine a rack combine policy for aggregating and summarizing the intra-rack map calculation results in units of racks, and wherein the rack combining policy unit determines whether an estimated network delay time Sout for shuffling among the racks is greater than an estimated network delay time Sin for shuffling among nodes in a rack, from among the plurality of racks, calculates an estimated delay time Sout' for shuffling among the racks in a case of combining the racks when it is determined that the estimated network delay time Sout for shuffling among the racks is greater than the estimated network delay time Sin for shuffling among nodes in the rack (Sin<Sout), and determines whether a ratio (Sout/Sout') of the estimated network delay time Sout for shuffling before the racks are combined to the estimated delay time Sout' for shuffling after the racks are combined is greater than a preset threshold ratio r, and wherein the rack combining policy unit controls data shuffling among a plurality of nodes in at least one of the plurality of racks and between different racks of the plurality of racks based on the determination whether the ratio (Sout/Sout') of the estimated network delay time Sout for shuffling before the racks are combined to the estimated delay time Sout' for shuffling after the racks are combined is greater than the preset threshold ratio r.

5. The MapReduce control apparatus of claim 4, wherein the network condition information includes information on an inter-rack network band, an intra-rack network band, an amount of data to be shuffled among the racks, and an amount of data to be shuffled within a rack.

6. The MapReduce control apparatus of claim 4, wherein the rack combine policy device includes:
a partition information receiver configured to receive the partition information for performing reduce calculations; and
a shuffling policy unit configured to determine a shuffling policy for reduce calculators according to the determination result of the rack combining policy unit.

7. The MapReduce control apparatus of claim 6, wherein the rack combining policy unit calculates an amount of data Din to be shuffled among MapReduce apparatuses in the rack and an amount of data Dout to be shuffled to a MapReduce apparatus of another rack, and calculates the estimated network delay time Sin for shuffling among nodes in the rack and the estimated network delay time Sout for shuffling among the racks.

8. The MapReduce control apparatus of claim 7, wherein the estimated network delay time Sin for shuffling among nodes in the rack, among the plurality of racks, is a value obtained by dividing the amount of data Din to be shuffled among MapReduce apparatuses in the rack by a sum Brack of network bandwidths of the MapReduce apparatuses in the rack.

9. The MapReduce control apparatus of claim 7, wherein the estimated network delay time Sout for shuffling among the racks is a value obtained by dividing the amount of data Dout to be shuffled to a MapReduce apparatus of another rack by a network bandwidth Bcore between a rack switch and a core switch.

10. The MapReduce control apparatus of claim 4, wherein, when the ratio (Sout/Sout') of the estimated network delay time Sout for shuffling before the racks are combined to the estimated delay time Sout' for shuffling after the racks are combined is greater than the preset threshold ratio r, the rack combining policy unit determines whether or not to combine the racks, a number of MapReduce apparatuses which will combine the racks, and node-specific ranges (amounts) of intermediate data records for which the racks will be combined, determines MapReduce apparatuses which will combine the racks, and instructs the MapReduce apparatuses to combine the racks.

11. The MapReduce control apparatus of claim 6, wherein, when the rack combining policy unit is notified that all rack combiners of MapReduce apparatuses have finished combining the racks, the rack combining policy unit transfers bandwidth information of a new key according to new intermediate data to reduce calculators of the MapReduce apparatuses through the shuffling policy unit and instructs the reduce calculators to perform reduce calculations.

12. A MapReduce control method of a MapReduce control apparatus, comprising:
receiving partition information for performing reduce calculations;
determining a rack combine policy for aggregating and summarizing intra-rack map calculation results in units of racks based on the partition information and network condition information; and
instructing corresponding MapReduce apparatuses to combine a plurality of racks, each rack including at least one node, each node including a MapReduce apparatus, according to the determined rack combine policy;
wherein the determining of the rack combine policy includes:
determining whether an estimated network delay time Sout for shuffling among the plurality of racks is greater than an estimated network delay time Sin for shuffling among nodes in a rack, from among the plurality of racks;
calculating an estimated delay time Sout' for shuffling among the racks in a case of combining the racks when the estimated network delay time Sout for shuffling among the racks is greater than the estimated network delay time Sin for shuffling among nodes in the rack; and
determining whether a ratio (Sout/Sout') of the estimated network delay time Sout for shuffling before the racks are combined to the estimated delay time Sout' for shuffling after the racks are combined is greater than a preset threshold ratio r, and
wherein data shuffling among a plurality of nodes in at least one of the plurality of racks and between different racks of the plurality of racks is controlled based on the determination whether the ratio (Sout/Sout') of the estimated network delay time Sout for shuffling before the racks are combined to the estimated delay time Sout' for shuffling after the racks are combined is greater than the preset threshold ratio r.

13. The MapReduce control method of claim 12, wherein the determining of the rack combine policy includes:
   calculating an amount of data Din to be shuffled among MapReduce apparatuses in the rack and an amount of data Dout to be shuffled to a MapReduce apparatus of another rack;
   calculating the estimated network delay time Sin for shuffling among nodes in the rack; and
   calculating the estimated network delay time Sout for shuffling among the plurality of racks.

14. The MapReduce control method of claim 13, wherein the calculating of the estimated network delay time Sin for shuffling among nodes in the rack includes dividing the amount of data Din to be shuffled among MapReduce apparatuses in the rack by a sum Brack of network bandwidths of the MapReduce apparatuses in the rack.

15. The MapReduce control method of claim 13, wherein the calculating of the estimated network delay time Sout for shuffling among the racks includes dividing the amount of data Dout to be shuffled to a MapReduce apparatus of another rack by a network bandwidth Bcore between a rack switch and a core switch.

16. The MapReduce control method of claim 12, wherein the determining of the rack combine policy further includes:
   when the ratio (Sout/Sout') of the estimated network delay time Sout for shuffling before the racks are combined to the estimated delay time Sout' for shuffling after the racks are combined is greater than the preset threshold ratio r, determining whether or not to combine the racks, a number of MapReduce apparatuses which will combine the racks, and node-specific ranges (amounts) of intermediate data records for which the racks will be combined; and
   determining MapReduce apparatuses which will combine the racks.

17. The MapReduce control method of claim 12, further comprising, when the MapReduce control apparatus is notified that all rack combiners of the MapReduce apparatuses have finished combining the racks, transferring bandwidth information of a new key according to new intermediate data to reduce calculators of the MapReduce apparatuses and instructing the reduce calculators to perform reduce calculations.

* * * * *